United States Patent
Vidal Cassanya

(10) Patent No.: US 9,654,289 B2
(45) Date of Patent: May 16, 2017

(54) METHOD FOR GENERATING A PSEUDORANDOM SEQUENCE, AND METHOD FOR CODING OR DECODING A DATA STREAM

(71) Applicant: ENIGMEDIA S.L., San Sebastián, Gipuzkoa (ES)

(72) Inventor: Gerard Vidal Cassanya, San Sebastián (ES)

(73) Assignee: ENIGMEDIA S.L., San Sebactian, Gipuzkoa (ES)

( * ) Notice: Subject to any disclaimer, the term of this patent is extended or adjusted under 35 U.S.C. 154(b) by 0 days.

(21) Appl. No.: 14/403,371

(22) PCT Filed: May 23, 2013

(86) PCT No.: PCT/EP2013/060662
§ 371 (c)(1),
(2) Date: Nov. 24, 2014

(87) PCT Pub. No.: WO2013/174944
PCT Pub. Date: Nov. 28, 2013

(65) Prior Publication Data
US 2015/0098568 A1  Apr. 9, 2015

Related U.S. Application Data

(60) Provisional application No. 61/682,964, filed on Aug. 14, 2012.

(30) Foreign Application Priority Data

May 24, 2012  (EP) ..................... 12382201

(51) Int. Cl.
*H04L 9/00*  (2006.01)
*H04L 9/08*  (2006.01)
*H04L 9/06*  (2006.01)

(52) U.S. Cl.
CPC ............ *H04L 9/0869* (2013.01); *H04L 9/001* (2013.01); *H04L 9/0668* (2013.01); *H04L 2209/24* (2013.01); *H04L 2209/34* (2013.01)

(58) Field of Classification Search
CPC ...................................... H04L 9/0668
(Continued)

(56) References Cited

U.S. PATENT DOCUMENTS 4,823,306 A * 4/1989 Barbic ............. G06F 17/30011
6,049,608 A * 4/2000 Ablowitz ............. H04L 9/0668
380/265

(Continued)

FOREIGN PATENT DOCUMENTS

EP     0467239 A2   1/1992
JP     2002252610 A   9/2002

OTHER PUBLICATIONS

Cassanya, Gerald Vidal, "Sincronizacion y control de sistemas dinamicos en regimen de caos espacio-tem poral", Theses Universidacl De Navarra Facultad De Ciencias, Nov. 26, 2010, pp. 1-140, XP007921191, ISBN:84-8081-091-2.

(Continued)

*Primary Examiner* — Taghi Arani
*Assistant Examiner* — Khalil Naghdali
(74) *Attorney, Agent, or Firm* — Reising Ethington P.C.

(57) ABSTRACT

The present invention relates to a method for coding a first data stream and a method for decoding a second data stream wherein the coding is the result of comparing the first data stream with a third data stream formed by a pseudorandom sequence by means of an exclusive comparison operation (XOR). Specifically, the invention relates to the methods based on hyperchaotic coding methods for generating the pseudorandom sequences used in coding and decoding.

16 Claims, 4 Drawing Sheets

(58) Field of Classification Search
USPC ............................................................ 380/46
See application file for complete search history.

(56) References Cited

U.S. PATENT DOCUMENTS

| | | | |
|---|---|---|---|
| 7,218,733 B2* | 5/2007 | Li | ............................ H04L 9/001 380/28 |
| 2004/0086117 A1 | 5/2004 | Petersen et al. | |
| 2007/0053507 A1* | 3/2007 | Smaragdis | .............. H04L 9/008 380/28 |
| 2011/0040711 A1* | 2/2011 | Perronnin | ................ G06N 7/00 706/12 |
| 2012/0030268 A1 | 2/2012 | Liu et al. | |

OTHER PUBLICATIONS

International Search Report for application No. PCT/EP2013/060662, dated Aug. 13, 2013, 3 pages.
International Preliminary Report on Patentability for application No. PCT/EP2013/060662, dated Sep. 30, 2014, 7 pages.

* cited by examiner

METHOD FOR GENERATING A PSEUDORANDOM SEQUENCE, AND METHOD FOR CODING OR DECODING A DATA STREAM

RELATED APPLICATION

This application is the National Stage of International Patent Application No. PCT/EP2013/060662, filed on May 23, 2013, which claims priority to and all the advantages of European Patent Application No. EP12382201.7, filed May 24, 2012, and U.S. Provisional Patent Application No. 61/682,964, filed Aug. 14, 2012.

OBJECT OF THE INVENTION

The present invention relates to a method for coding a first data stream giving rise to a second coded data stream, and a method for decoding this second data stream wherein the coding is the result of comparing the first data stream with a third data stream formed, by a pseudorandom sequence by means of an exclusive comparison operation (XOR). Specifically, the invention relates to methods based on hyperchaotic coding methods for generating the pseudorandom sequences used in coding and decoding.

BACKGROUND OF THE INVENTION

The present invention is encompassed within the field of information stream coding in secure communications. Specifically, it is encompassed within the field of methods based on hyper-chaotic systems some of which are known in the state of the art.

In a simple case of communication where a message is sent from a transmitter A to a receiver B, the message is coded by a method such that A and B can code and decode respectively.

The coded information is called a cipher or an encrypted, message and is sent through the communication channel. The message is formed by a bitstream of any length, and A and B generate a binary sequence for coding and decoding, respectively. These binary sequences are the encryption sequences.

If the message from A is encrypted by performing a binary XOR operation, the table of which is shown in Table 1, with an encryption sequence for A, the original message is recovered in B if the encryption sequence applied in A is the same as the encryption sequence applied in B.

TABLE 1

| XOR table | | |
|---|---|---|
| Original message (M) | Encryption sequence (S) | Encrypted message (M XOR S) |
| 0 | 0 | 0 |
| 0 | 1 | 1 |
| 1 | 0 | 1 |
| 1 | 1 | 0 |

The invention is based on the contributions published in the thesis by the same author "Vidal, G. Sinczonlzación y control de sistemas dinámicos en régimen de caos espacio-temporal (Synchronization and control, of dynamical systems in space-time chaos) (PhD Thesis, University of Navarra, Spain, 2010)" detailing the method for obtaining random sequences based on hyperchaotic systems and the sequences being generated from a dynamical system.

A dynamical system is a system the state of which evolves over-time. The behavior in said state can be modeled by determining the behavior equations of the system after identifying the elements involved and their relations. A dynamical system modeled by means of a differential equation or a system of differential equations allows describing it in terms of its behavior through solving said equation or system of equations. Particularly, it is possible to express a differential equation of a first order initial value problem in the form of $x'(t)=f(t, x(t))$ wherein $x(t)$ is the solution of the system, as a function of time t, and wherein the initial conditions are $x(t_0)=x_0$. If instead of an ordinary differential equation the system requires the use of more variables, then x is a vector variable belonging to the $R^n$ space, n being the dimension of the system of equations and wherein each component of the vector x is a variable as a function of time.

Chaotic cryptography is based on the use of chaos theory on secure communications systems. Chaos theory studies deterministic systems with high response sensitivity to a small change in the initial conditions.

Systems A and B are synchronized when the coding starts. This means that the same random sequence is being generated in both to enable coding and decoding the message using the XOR operator at both ends of the communication. If this synchronization does not occur, the decoded message will not be the originally coded message.

The method described in the aforementioned thesis document proposes a method for generating random sequences wherein both systems A and B solve respective systems of differential equations. The objective is to search for an encryption complying with the theoretical approach by C. E. Shannon "Shannon, C. E. [1949]"Communication Theory of Secrecy Systems" Bell System Technical Journal 28, pp. 656-715" stating that a condition necessary and sufficient so that a message complies with "perfect secrecy" is that the encryption does not probabilistically depend on the message, therefore a probabilistic approach cannot be used to discover properties of the message. Another important conclusion made by Shannon is that if the length of the key is not an inconvenience, the Vernam cipher is the most suitable. A Vernam cipher has 3 fundamental features:

1. The key, in this case the encryption sequence, must be as long as the message to be encrypted,
2. Once the key has been used, it cannot be used again. For this reason the Vernam cipher is also called a "one-time pad".
3. The key is made up of a list of random uniformly distributed symbols.

The first property requires the key to be long enough. Theoretically when using a chaotic dynamical system, the trajectories can be as long as necessary without ever becoming periodic. It is not possible to have a sequence of infinite length in a computer, but it can be implemented with sufficient precision to integrate time periods without the rounding errors affecting the method and that these time periods are long enough as required by the cases to be dealt with.

The second property can be easily achieved by software, prohibiting the repetition of values of initial conditions.

A particular case of an encryption and decryption technique described in the thesis document establishes two coupled systems of differential equations associated with an initial value problem. These systems of equations, one used for generating the encryption key and the other for generating the decryption key, are such that even though they start from different initial conditions, they end up evolving according to the same solution after being integrated for a determined time period due to the coupled terms.

There are two options for carrying out the coupling assuring communication end authenticity: either the values of the coupling parameters of the dynamical system are public, and there is a third entity to enable authenticating the message receiver, or the values of the dynamical parameters are exchanged through a secure channel, such as for example by using RSA (Rivest, Shamir and Adleman) keys or Diffie-Hellman keys.

The second property can also be achieved by software, prohibiting the repetition of coupling factors.

In most of the known cases of the state of the art, these two properties involve passing massive keys through the communication channels and the cost is too high. However, in the example described in the thesis document only one set of parameters is transmitted. These parameters provide access to a set of keys which are as many as the "digital" points found, in the phase space, where the trajectories are enclosed. However, to know the specific key it is necessary to carry out the synchronization process between systems A and B; i.e., it is necessary to integrate both systems long enough in order to consider that the solution obtained in both systems as a function of time is the same or the difference thereof is below a very small threshold value or a value known as a "machine error" if work is done with a computer.

The third property requires random signals; however, the starting point is a deterministic system. The dynamical properties of the system and a signal whitening process are used to perform this process. One of the main problems of continuous deterministic signals, even hyperchaotic signals, is how easy they can be tracked. This means that a spy could more or less correctly estimate the next values of the signal by knowing the previous instants. Therefore the possible spy could limit the possible initial conditions until finally discovering the key. A whitening process is used to prevent such attack. The thesis document describes a whitening process which allows transforming the continuous signal into a binary signal. To start, highly uncorrelated continuous signals are required, minimizing the statistical information of the encrypted message.

The thesis document describes a method which is based on the fact that hyperchaotic systems have continuous signals the temporal autocorrelation of which is quickly lost. On the other hand, it is also desirable that the sequence generating system is a high-dimensional system, therefore it is more difficult for periodic orbits to appear in the solution of the solved system of equations, a typical problem when working with computerized chaos. If there is periodicity in the solution to the system of equations, the work of the spy is being helped since he/she would have a temporal reference to measure the statistics of the system.

Another requirement that the method for coding must comply with is to assure that there is no bijective function between the encrypted message and the original message, or what is known in cryptography as the inverse function problem. To that end the signal whitening method is used, eliminating most of the phase and amplitude information. Therefore the function linking the message and the cipher will no longer be bijective, and therefore one and the same encrypted bitstream can have different meanings. However, since the two systems are synchronized they will always have the same unencrypted message.

The main technical problem of the signal whitening method proposed by the thesis document is the high computational cost involved in addition to the fact that a completely uncorrelated pseudorandom sequence is not generated.

DESCRIPTION OF THE INVENTION

The present invention solves the problem described above by means of a method for generating a pseudorandom sequence according to claim 1, a method for coding a data stream or decoding a coded data, stream according to claim 11, a message coder according to claim 14, an encrypted message decoder according to claim 15 and a communication system according to claim 16. The dependent claims define preferred embodiments of the invention.

A first inventive aspect of the invention is a method for generating a pseudorandom sequence which comprises the following steps:
a) providing a differential equation of initial value $x'=f(x,t)$,
b) providing an initial value for the differential equation $x_0=x(t_0)$,
c) providing an integration step $\delta_t$ for the differential equation for time discretization $t_k=t_0+k\cdot\delta_t$, $k=1,2,3\ldots$,
d) carrying out the numerical integration of the differential equation from the initial value and with the step $\delta_t$ for obtaining the approximation to solution $x_k=x(t_k)$,
e) generating a first sequence of values by sampling the values $x_k$ numerically representable in floating point in the form, of $0.d_0d_1d_2d_3d_4\ldots d_r\ldots d_w\cdot 10^e$, e being the exponent, w the length of the mantissa, $d_0$, the most, representative digit of the mantissa and $d_r$ a digit such that it and all the digits to its left of the approximation to solution $x_k$ coincide with the exact value of the solution of the differential equation,
f) generating the pseudorandom sequence with the digits $d_i\ldots d_r$ from a selection of the sequence of values $x_k$ wherein i is a predetermined integer value verifying $0>i\geq r$.

The first step to start the generation of the pseudorandom sequence is to establish the dynamical system which will be used to generate the pseudorandom sequence for encryption. The dynamical system is defined with a differential equation of solution x(t), abbreviated as x. After providing an initial value and an integration step resulting from a time discretization for the integration of the initial value problem, the differential equation from the initial-value is numerically integrated to calculate the solution x(t). In other words, the sequence of actual values $x_k$ is obtained by calculating the numerical solution x(t) to the equation $x'-f(x,t)$ given the initial value $x_0=x(t_0)$ for each instant $t_k=t_0+k\cdot\delta_t$, $k=1,2,3\ldots$ The values of the sequence $x_k$ are representable in floating point wherein said representation can be expressed as $x_k=.d_0d_1d_2d_3d_4\ldots d_r\ldots d_w\cdot 10^e$, e being the exponent, w the length of the mantissa, $d_0$ the most representative digit of the mantissa and $d_r$ a digit, such that it and all the digits to its left of the approximation to solution $x_k$ coincide with the exact value of the solution of the differential equation. Once this is done, the pseudorandom sequence with the digits $d_i\ldots d_r$ is generated from a selection of the sequence of values $x_k$ wherein i is a predetermined integer value verifying $0>i\geq r$; i.e., digits of the actual number complying with the following are used:
they belong to the mantissa,
they are digits coinciding with the exact solution of $x_k$,
they are not the most representative.

Choosing from a selection of $x_k$ gives rise to a collection of values which will be more uncorrelated when they are more separated in the time line.

The last property of not being the most representative digits of the actual number $x_k$ provides the advantage of generating a sequence of values that uncorrelated with respect to one another in the shortest time possible. Upon eliminating the dependence between more representative digits a sequence the values of which are uncorrelated is obtained.

According to the state of the art, to reduce the degree of correlation among samples the distance between the elements of the selection $x_k$ is widened. Distancing the elements of the section $x_k$ involves the evaluation of many intermediate points by means of numerical integration until obtaining a new sample $x_k$. In turn, the integration of each of the steps involves a high computational cost due to the required number of intermediate functions and calculations.

In contrast, even though the invention reduces the number of digits used for generating the data stream for coding or decoding, it allows drastically reducing the distance in the time variable between the samples $x_k$ of the selection. In other words, for one and the same integration a greater number of samples is used, significantly increasing the volume of random uncorrelated digits generated for the same computational cost.

A second inventive aspect of the invention is a method for coding a data stream for the transmission of said data by means of a coded stream wherein the coding is the result of comparing the data stream with a second data stream formed by a pseudorandom sequence by means of an exclusive comparison operation (XOR), or a method for decoding a coded data stream wherein the decoding is the result of comparing the coded data stream with a second data stream formed by a pseudorandom sequence by means of an exclusive comparison operation (XOR), characterized in that the generation of the pseudorandom sequence is made by means of the method according to the first inventive aspect.

As explained above, the sequences generated in systems A and B must be the same so that upon applying the XOR operation on both sides of the communication the original message is obtained in B. By solving the same differential equation in both systems and generating the pseudorandom sequence following the same steps, this condition is fulfilled with the same advantages.

A third inventive aspect is a message coder suitable for carrying out a method for coding a data stream for the transmission of said data by means of a coded stream wherein the coding is the result of comparing the data stream with a second data stream formed by a pseudorandom sequence by means of an exclusive comparison operation (XOR) characterized in that the generation of the pseudorandom sequence is made by means of a method according to the first inventive aspect.

A fourth inventive aspect is an encrypted message decoder for carrying out a method for decoding a coded data stream wherein the decoding is the result of comparing the coded data stream with a second data stream formed by a pseudorandom sequence by means of an exclusive comparison operation (XOR), characterized in that the generation of the pseudorandom sequence is made by means of a method according to the first inventive aspect.

A fifth inventive aspect is a communication system including at least one coder according to the third inventive aspect and at least one decoder according to the fourth inventive aspect.

In a particular embodiment, the communication system is a mobile communications system. The initial value $x_0$ is provided to both systems from a communication center. If, for example, A and B are mobile terminals, this communication center can be the BTS-based (base transceiver station) station. In this embodiment the same random sequences are generated at both ends of the system to enable recovering the original message by applying the XOR operator. These sequences are the same because the same differential equation with the same initial value is solved.

DESCRIPTION OF THE DRAWINGS

The foregoing and other advantages and features of the invention will be better understood from the following detailed description of a preferred embodiment in reference to the attached drawings provided by way of illustrative and non-limiting example.

DETAILED DESCRIPTION OF THE INVENTION

Figure 1:
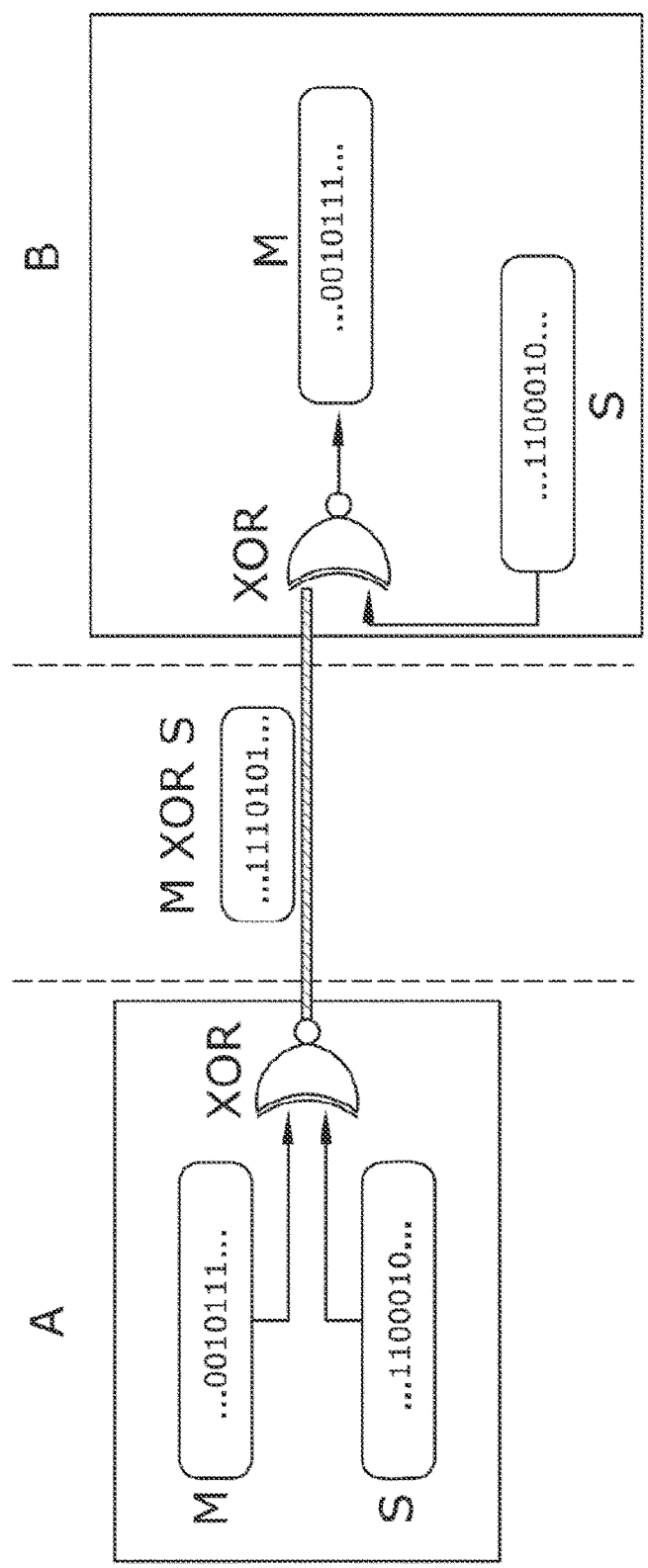
FIG. 1 illustrates an embodiment of a communication between two terminals A and B and the elements participating in the coding.

The present invention is applied in processes for coding messages in the transmission between two ends in a communication system. Therefore, as illustrated in FIG. 1, a message (M) is coded at a first end of the communication (A) using the XOR operator with the encryption sequence (S). The encrypted message (M XOR S) is sent through the transmission channel. The encrypted message is decoded at the opposite end of the communication (B) by applying the XOR operator again. The invention focuses on the generation of coding sequences (S) which are identical at each end of the communication to enable obtaining the message (M) by applying the XOR operator in B. The coding sequence (S) is a pseudorandom sequence.

The invention presents a method for coding a data stream for the transmission of said data by means of a coded stream wherein the coding is the result of comparing the data stream with a second data stream formed, by a pseudorandom sequence by means of an exclusive comparison operation (XOR), characterized in that the generation of the pseudorandom sequence comprises the following steps:

a) providing a differential equation of initial value $x'=f(x,t)$, b) providing an initial value for the differential equation $x_0=x(t_0)$, c) providing an integration step $\delta_t$ for the differential equation for time discretization $t_k=t_0+k\cdot\delta_t$, $k=1,2,3\ldots$, d) carrying out the numerical integration of the differential equation from the initial value and with the step $\delta_t$ for obtaining the approximation, to solution $x_k \approx x(t_k)$, e) generating a first sequence of values by sampling the values $x_k$ numerically representable in floating point in the form of $0.d_0d_1d_2d_3d_4 \ldots d_r \ldots d_w \cdot 10^e$, $e$ being the exponent, w the length of the mantissa, $d_0$ the most representative digit of the mantissa and $d_r$ a digit such that it and all the digits to its left of the approximation to solution $x_k$ coincide with the exact, value of the solution of the differential equation, f) generating the pseudorandom sequence with the digits $d_i \ldots d_r$ from a selection of the sequence of values $x_k$ wherein i is a predetermined integer value verifying $0 > i \geq r$.

The invention also presents a method for decoding a coded data stream by means of the method according to the first inventive aspect wherein the decoding is the result, of comparing the coded, data stream with a second data stream formed by a pseudorandom sequence by means of an exclusive comparison operation (XOR) characterized in that the generation of the pseudorandom sequence comprises steps a)-f) of a method according to the first inventive aspect.

Figure 2:
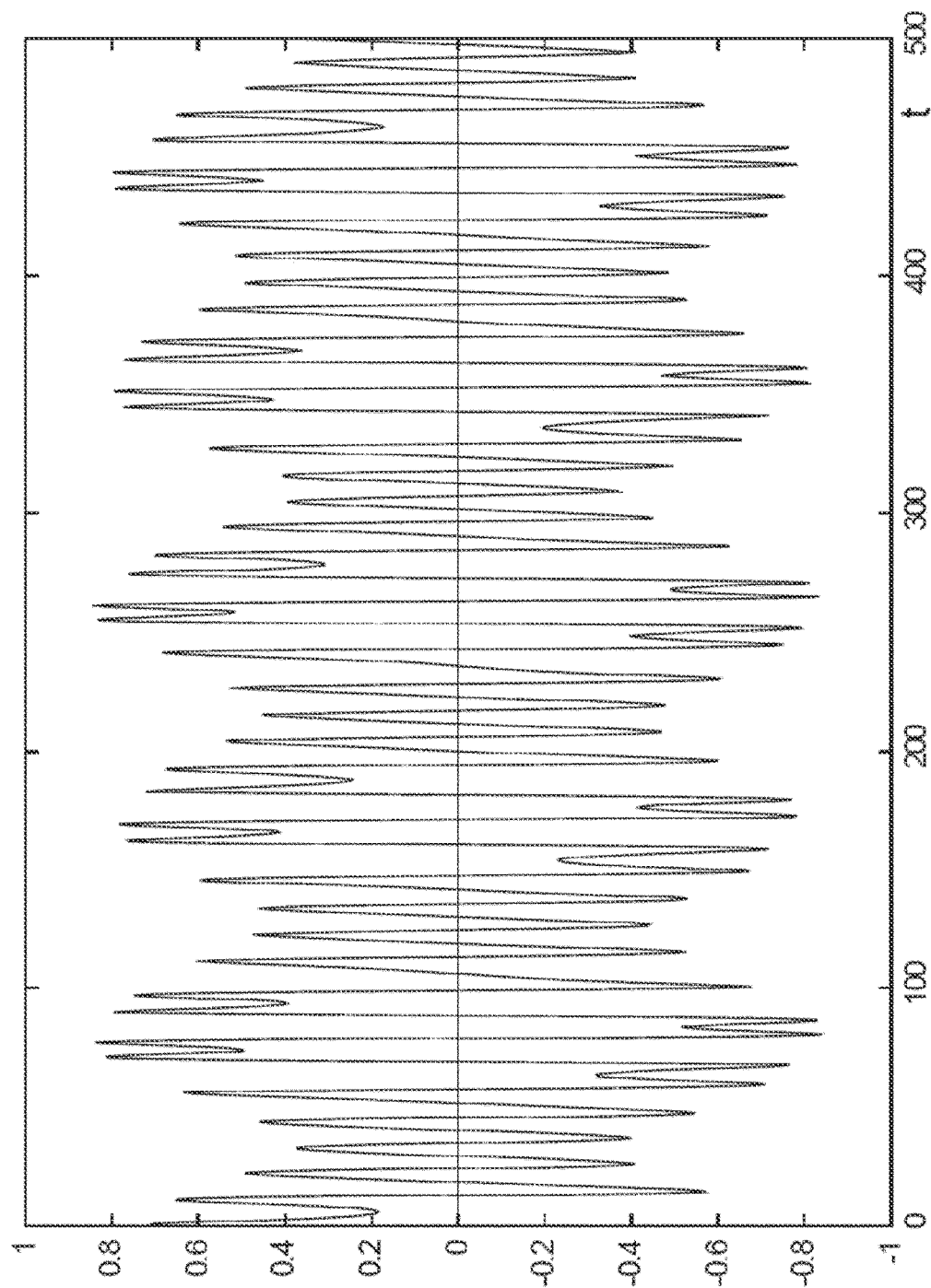
FIG. 2 depicts an embodiment of a solution to the differential equation $x'=f(x,t)$.

The illustration of FIG. 2 is used as an embodiment to illustrate the described advantages where the solution of the differential equation $x'=f(x,t)$ for a specific initial value is depicted by means of a continuous curve. After selecting an integration step, a numerical approximation is obtained by means of a method for integrating initial value problems, for example, by making use of an explicit calculation method.

Even so, the values of the solution between consecutive steps are highly correlated and it is necessary to integrate many integration steps so as to enable taking said value to use its digits for generating the encryption or decryption sequence.

Figure 3:
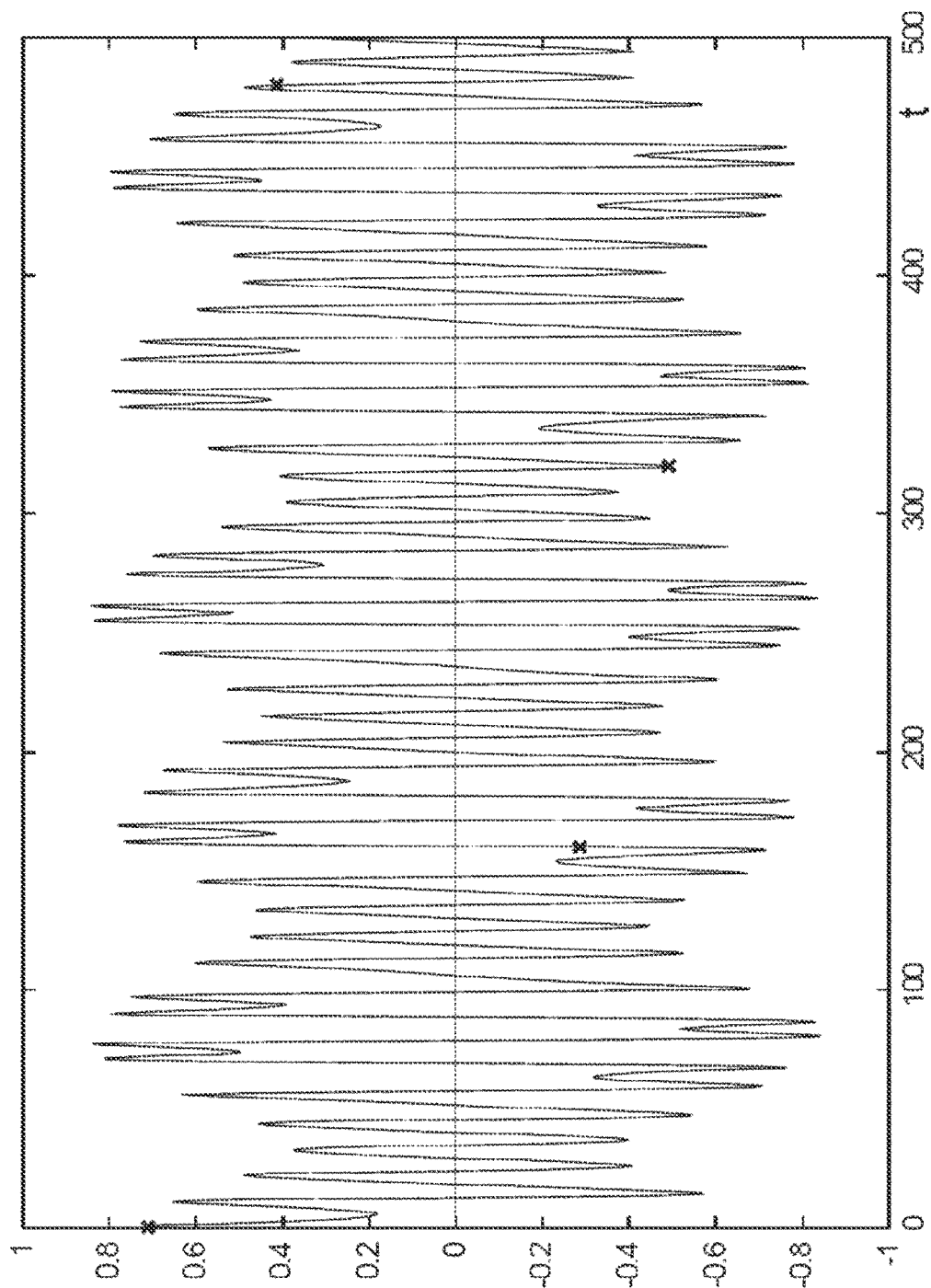
FIG. 3 depicts the sampled and uncorrelated values marked with an X.

One example is the integration of an initial value problem which allows obtaining a pseudorandom solution such as that shown in FIG. 2 where the temporal space from 0 to 500 seconds is illustrated. Three values extracted, from the values resulting from the numerical method of integration are selected, these being highlighted in FIG. 3 on the curve of the solution obtained by means of the same method of integration. The mantissas of these three values are the following:

0.71(11)76 (for t=0 s)
−0.28(60)51 (for t=160 s)
−0.49(14)38 (for t=320 s).

The exponents of each of the three values have only been taken into account to establish that the first digit to the right of the decimal point is the first non-null digit of the mantissa.

In this sequence of values the digits have been highlighted in parentheses, leaving the most significant digits on the left and the digits which can be affected by rounding errors due to the architecture of the computer where the integration is executed on the right.

This selection of less significant digits eliminates the temporal dependence between values.

Although an actual number is representable in many forms, the method considers the digits resulting from this particular representation (regardless of the exponent).

A method that uses a set of digits discarding:
the most significant digits and
the digits corresponding to rounding errors,
is a manner of carrying out the invention with a particular way of representing the actual values (the values belonging to the body of the actual numbers) since they are also representable in the form indicated in step e) of a method for coding a data, stream, as described above.

The parentheses on the left and the parentheses on the right, are in the position leaving therein the digits $d_i \ldots d_r$ corresponding to step f) of the method according to claim 1. Depending on each example, the positions of the parentheses, therefore the range of digits $d_i \ldots d_r$, will be different and pre-established before applying the integration.

Concatenating the digits in parentheses will give rise to the sequence: 116014. Given that one of the advantages of the claimed method allows taking samples closer in time, it is possible to make use of more values providing digits for the generation of the sequence for one and the same range of time, always verifying the non-correlation properties.

In one embodiment of the invention, in the methods for coding and decoding, in step d) numerical integration is carried out not of a differential equation but of a system of n differential ecru at ions with n unknowns; i.e., $x'_s=f_s(x_1, x_2, \ldots x_n, p_1, p_2, \ldots, p_m, t)$, $s=1 \ldots n$, n being the number of unknowns, and m the number of parameters, $p_j$, $j=1 \ldots m$, such that the pseudorandom sequence in step f) is generated from one of the n variables preselected from the system of differential equations. The system of equations provides the advantage that the variable of interest depends on the variability of other variables and therefore it is less likely that a spy can successfully reproduce the same pseudorandom, sequence to decrypt the coded message during transmission from A to B.

In one embodiment of the methods, the following steps are carried, out;

determining an integration time T, proposing a perturbed system of equations which can be expressed in the following manner:

$$x'^A_1 = f_1(x_1, x_2, \ldots, x_n, p_1, p_2, \ldots, p_m, t) + \epsilon_1^A(x_1^B - x_1^A),$$

$$x'^A_2 = f_2(x_1, x_2, \ldots, x_n, p_1, p_2, \ldots, p_m, t) + \epsilon_2^A(x_2^B - x_2^A),$$

$$x'^A_n = f_n(x_1, x_2, \ldots, x_n, p_1, p_2, \ldots, p_m, t) + \epsilon_R^A(x_n^B - x_n^A),$$

for the generation of the coding sequence as well as initial values; and, proposing a perturbed system of equations which can be expressed in the following manner;

$$x'^B_1 = f_1(x_1, x_2, \ldots, x_n, p_1, p_2, \ldots, p_m, t) + \epsilon_1^B(x_1^A - x_1^B),$$

$$x'^B_2 = f_2(x_1, x_2, \ldots, x_n, p_1, p_2, \ldots, p_m, t) + \epsilon_2^B(x_2^A - x_2^B),$$

$$x'^B_2 = f_n(x_1, x_2, \ldots, x_n, p_1, p_2, \ldots, p_m, t) + \epsilon_n^B(x_n^A - x_n^B),$$

for the generation of the decoding sequence as well as initial-values not necessarily coinciding with the initial values proposed for the generation of the coding sequence, prior to coding and decoding the data, generating a first coding sequence and a first decoding sequence by integrating both perturbed systems of equations over time T wherein both systems are coupled by means of the terms multiplied by $\epsilon_s^A$, $\epsilon_s^B$, $s=1 \ldots n$, $\epsilon_s^A$, $\epsilon_s^B$ being positive values in which at least one value in the system associated with the coding and the other value in the system associated with the decoding is non-null value such that an exchange of at least the values of the variables $x_1, x_2, \ldots x_n$ which are multiplied by a non-null value $\epsilon_s^A$, $\epsilon_s^B$, $s=1 \ldots n$ is carried out during the integration through an exchange channel until the convergence of both systems, providing the data coding and decoding sequence by integrating the same equations from the values achieved in the integration carried out in preceding step independently used as an initial condition without exchanging coupling values and without incorporating the terms with $\epsilon_s^A$, $\epsilon_s^B$, $s=1 \ldots n$.

The advantage of using a perturbed system of equations is that by introducing the coupling factors $\epsilon_s^A, \epsilon_s^B$, s=1 . . . n, the convergence of both systems is achieved without needing the initial conditions chosen for the integration for time T to coincide in both systems A and B. The coupling terms which are expressed as $\epsilon_i^A(x_i^B-x_i^A)$ can be interpreted as feedback signals. When the systems are in a complete synchronization regime these terms cancel one another out. At that time, the two systems A and B reproduce the same trajectory. The measurement of the difference $(x_i^A-x_i^A)$ compared with a small pre-established threshold value is an example of criterion to determine whether the systems are synchronized.

This means that if the value $x_i^B$ reaches system. A and $x_i^A=x_i^B$ for a certain time, the systems will be synchronized. It is therefore not necessary to share information prior to the integration, such that a secure communication is achieved without exchanging information susceptible of being intercepted by a spy. This is a case of symmetric encryption.

This situation means that it is necessary for both systems to communicate their variables through a public channel so that it is known at both ends of the communication, A and B, when the synchronization has arrived, which is when the variables in both systems have the same value. This exchange of variables is performed in time intervals that do not necessarily need to coincide with the integration time, T. When it is detected that convergence in the values of the variables has been achieved the coding of the message in A is started and the subsequent transmission of the coded message taking, as an initial value, a value of the solution in an instant of time such that it belongs to the solution obtained after assuring that the systems are synchronized; and by all means, in the same instant in both systems. In one embodiment, this value is the last value of the integration achieved in both systems.

In a particular embodiment of the invention, the exchange of the variables is performed over an exchange channel encrypted by means of public key. This provides the advantage of providing security to the communication system because, even though the values of the variables exchanged are known, it is not possible to deduce the solution since the system of equations is not known, even in the case where this secret has been disclosed it would be impossible to know the evolution of the solution given that the exchanged parameters are encrypted.

In a particular embodiment of the invention, by implementing the methods for coding and decoding, after step f), each digit d is depicted in binary with a pre-established word size D1, concatenating it to a binary sequence.

This way of representing the actual number provides the technical advantage of using the internal representation of a computer to directly generate the pseudorandom sequence. Therefore, results showing the advantage of computational saving by taking the digits $d_i$ . . . $d_r$ of the values selected from $x_k=x(t_k)$ have been obtained in this embodiment. Therefore, there are two uncorrelated values taken from $x_k$ and $x_{k+1}$ in a time much shorter than that needed to find two uncorrelated values by taking all the digits without applying the method in accordance with the invention. In the particular embodiment, an empirical value of $d_i$ for which the values are known to be uncorrelated in half the time is used.

The method according to the invention entails the selection of a set of digits for each sample and allows at the same time using more samples in one and the same integration period. It has been proven that the greater number of samples compensates for the digit reduction and the resulting method is more efficient than those described in the state of the art.

On the other hand, the technical effect introduced by bits elimination is that it complicates the performance of statistical attacks for decrypting the pseudorandom sequence and thus the message.

In a particular embodiment after step f), each digit d is made to correspond to a binary expression with a word size D1, concatenating it to a binary sequence.

As an illustrative example, $D_1$5, $x_k$=0.563124, $x_k$=0.648521, r=6, i=4, are taken such that a section of the pseudorandom sequence is:

$d_4$ . . . $d_6$ of $x_k$: 124→binary representation of each digit with 5 bits: 000010001000100, $d_4$ . . . $d_6$ of $x_{k+1}$: 521→binary representation of each digit with 5 bits: 001010001000001, therefore, the section of the pseudorandom sequence generated from the selection of values $x_k$ and $x_{k+1}$ is the concatenation: 124521→(and in binary) 000010001000100001010001000001.

In one embodiment, a word size D2 is pre-established and integer digits are formed from the binary sequence taking words of D2 bits.

Continuing with the embodiment, if $D_2$=3, then groups of 3 bits are formed from the sequence generated above and the representation thereof in decimal digits is obtained:

0000100010 00100001010001000001→0210412101

In one embodiment, before applying the exclusive comparison operation (XOR), the pseudorandom sequence is expanded, into a sequence with a greater number of elements according to the following steps:
pre-establishing a positive integer value,
constructing two vectors $V_1$ and $V_2$ of dimension DIM of integers from the pseudorandom sequence generated, for example, by taking DIM values to complete $V_1$ and the next DIM values of the sequence to complete $V_2$; and,
constructing an expansion matrix $M_e$ of dimension DIM× DIM from the product. $V_1 \cdot V_2^T$ wherein $V_2^T$ denotes the transposed vector of $V_2$,
generating the expanded sequence by means of concatenating the rows of the matrix $M_e$,
Continuing with the embodiment, if the pseudorandom, sequence is 02104121 . . . , then, if DIM is 3:
$V_1$=021 (column vector)
$V_2$=041 (column vector)

$$M_e = \begin{pmatrix} 0 \\ 2 \\ 1 \end{pmatrix} \cdot (0\ 4\ 1) = \begin{pmatrix} 0 & 0 & 0 \\ 0 & 8 & 2 \\ 0 & 4 & 1 \end{pmatrix}$$

expanded sequence=000082041,
therefore, in this particular embodiment, starting from two vectors of 3 digits a collection of 9 digits is advantageously obtained, giving rise to a new vector upon extracting them in rows, whereby the non-correlation or relation between the transmitted sequence and the starting equations is especially verified and the degree of randomness to complicate the work of a spy increases. Furthermore the computational efficiency increases because an "increased" number of digits is obtained with respect to the starting number of digits, therefore, fewer input bits are needed to generate a sequence of a specific number of bits.

In a particular embodiment, the following is performed after generating the expansion matrix:
a value $K_1$ is pre-established,
before generating the expanded sequence each element of the matrix $M_e$ is substituted with the value resulting from calculating the $K_1$ module thereof.

Continuing with the example, if the expansion matrix is $$M_e = \begin{pmatrix} 0 & 0 & 0 \\ 0 & 8 & 2 \\ 0 & 4 & 1 \end{pmatrix}$$

and K1=3,

Then, if the K-module operation is the operation the result of which, uses the remainder from dividing a first integer number with a second number, the following is obtained:

$$M_e = \begin{pmatrix} 0 & 0 & 0 \\ 0 & 2 & 2 \\ 0 & 1 & 1 \end{pmatrix},$$

then the pseudorandom sequence is;
S=000022011.

This mode of operation, wherein the K-module operation is applied for values of K in the range of [1,10], provides the advantage of being able to work with numbers with a single digit in the decimal system in the range of [0 ... 9]. This is advantageous when there are matrices the elements of which have very high values of the order of hundredths because $M_e$ is the result of a product, and it is therefore more expensive to work with them.

In a particular embodiment the following steps are additionally carried out:
in addition to the vectors $V_1$ and $V_2$, a vector $V_3$ of dimension DIM of integers is constructed from the pseudorandom sequence generated,
on each of the rows of the matrix $M_e$, before generating the expanded sequence by means of concatenating the rows of the matrix $M_e$, each of the rows of $M_e$ is circularly rotated a whole number of times in a pre-established direction, according to the integer value established by the same row of the vector $V_3$.

If that illustrated in the particular embodiments above is used as an example, the starting pseudorandom sequence must be s=021041.2.101.

Therefore,
$V_1$=021 (column vector)
$V_2$=041 (column vector)
$V_3$=210 (column vector of dimension DIM=3)

$$M_e = \begin{pmatrix} 0 \\ 2 \\ 1 \end{pmatrix} \cdot (0\ 4\ 1) = \begin{pmatrix} 0 & 0 & 0 \\ 0 & 8 & 2 \\ 0 & 4 & 1 \end{pmatrix} \rightarrow \text{rotate rows} \rightarrow \begin{pmatrix} 0 & 0 & 0 \\ 2 & 0 & 8 \\ 0 & 4 & 1 \end{pmatrix};$$

Therefore the first has been rotated 2 times clockwise, the second row has been rotated one time and the third row has not been rotated. Again the advantage is that the degree of randomness and non-correlation increases, preventing a spy from being able to deduce the starting sequence and therefore the differential equations used for generating the random sequence.

In a particular embodiment, the following steps are further performed after generating the vector $V_3$
pre-establishing a value $K_2$ preferably the DIM value,
before carrying out the circular rotation, substituting each element of vector $V_3$ with the value resulting from calculating the $K_2$-module thereof.

This prevents the elements in V3 from having high values which would lead to rotating rows of $M_e$ many times, even more than the dimension of the matrix itself, giving rise to redundant tasks. This operation optimizes the computational cost.

If an illustrative example in which the values of the elements of $V_3$ are high is considered, the following is obtained
the starting pseudorandom, sequence is s=021041897.1,
Therefore,
$V_1$=021 (column vector)
$V_2$=041 (column vector)
$V_3$=897 (column vector of dimension DIM=3)

$$M_e = \begin{pmatrix} 0 \\ 2 \\ 1 \end{pmatrix} \cdot (0\ 4\ 1) = \begin{pmatrix} 0 & 0 & 0 \\ 0 & 8 & 2 \\ 0 & 4 & 1 \end{pmatrix} \rightarrow \text{rotate rows} \rightarrow \begin{pmatrix} 0 & 0 & 0 \\ 0 & 8 & 2 \\ 1 & 0 & 4 \end{pmatrix};$$

If the rows are rotated the number of times dictated by the rows of vector $V_3$, the same result will be obtained as if each row of $V_3$ mod has been rotated 3 times or 2, 0 and 1 time, respectively.

Figure 4:
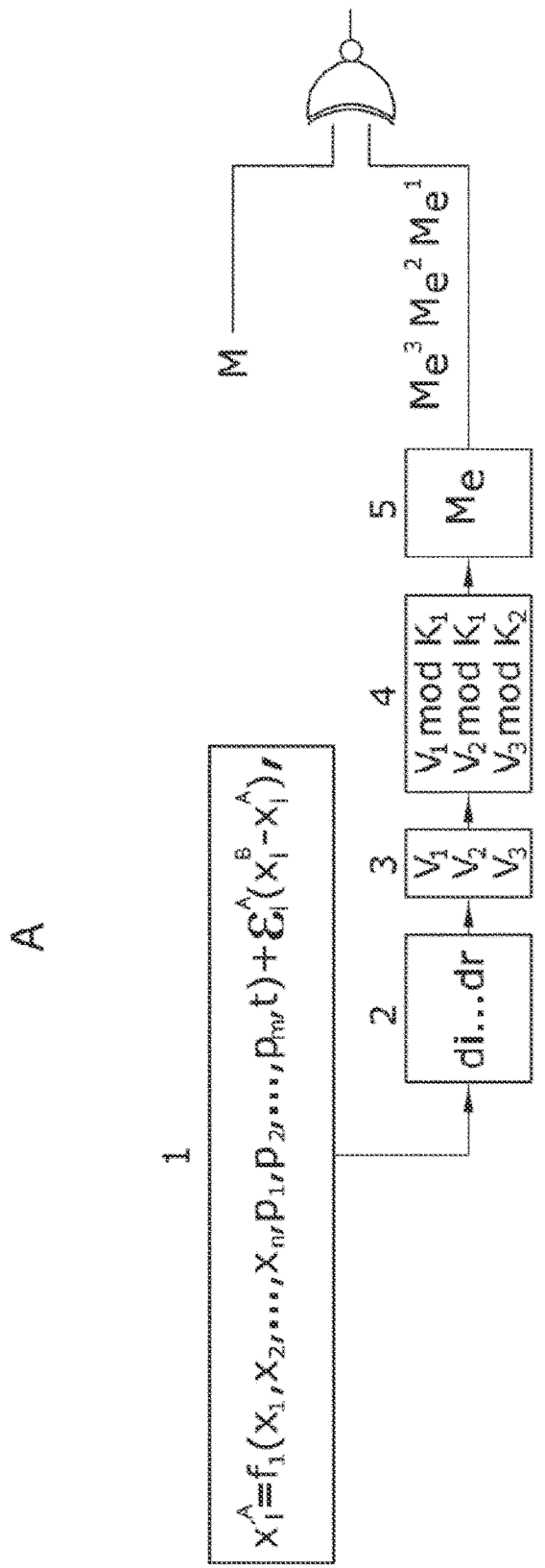
FIG. 4 depicts a particular embodiment of the system where different functional elements such as the module solving a system of differential equations which can be expressed in the form of $x'_s=f_s(x_1,x_2, \ldots, x_n, p_1, p_2, \ldots, p_m, t)$, $s=1 \ldots n$, the module selecting a range of digits of each $x_k$, and, a generator module generating the rows of a matrix known as the expansion matrix $M_e$, among others, are illustrated.

In a particular embodiment, instead of completely calculating the matrix $M_e$ to start working with the pseudorandom sequence and with the XOR operator, the rows of the matrix are calculated and work is performed with them. It is not necessary to first, construct the matrix and then extract the data stream. Therefore, as indicated in FIG. 4, the system; works faster and it is not necessary to save the entire matrix in a memory, only the row to be extracted, working directly with it. This provides full system efficiency. Advantageously, with the expansion matrix it is possible to lower the requirements for a system that implements the method both in a processor and in a memory, being able to be implemented in hardware that is not very powerful.

FIG. 4 shows the system with the functional elements generating the pseudorandom, sequence (S) with which the message (m) is coded. The same figure illustrates the system A with the different elements.

A first module (1) solving the system of equations is distinguished:

$$x'^A_1 = f_1(x_1, x_2, \ldots, x_m, p_1, p_2, \ldots, p_m, t) + \epsilon^A_1(x^B_1 - x^A_1),$$

$$x'^A_2 = f_2(x_1, x_2, \ldots, x_m, p_1, p_2, \ldots, p_m, t) + \epsilon^A_2(x^B_2 - x^A_2),$$

$$x'^A_n = f_n(x_1, x_2, \ldots, x_m, p_1, p_2, \ldots, p_m, t) + \epsilon^A_n(x^B_n - x^A_n),$$

The following are also distinguished:
second module (2) shortening the solution $x_k$ to its digits $d_i \ldots d_r$.
This second module (2) allows extracting, for each sample $x_k$, the digits giving rise to the pseudorandom sequence which will subsequently be treated. In one embodiment, the module can be a computer program code segment suitable for carrying out a method that selects the corresponding digits from values of actual numbers internally represented in a computer.

A third module (3) obtaining vectors $V_1$, $V_2$ and $V_3$.

This third module (3) uses the concatenation of the digits from the second module (2) and represents them such that it generates vectors $V_1$, $V_2$ and $V_3$, given a dimension DIM. In one embodiment, the third module (3) is a computer program code segment suitable for carrying out a method that generates vectors $V_1$, $V_2$ and $V_3$, given a pre-established, dimension DIM and a sequence of integer values provided by the second, module (2), A fourth module (4) obtaining $V_1$ mod $K_1$, $V_2$ mod and $V_3$ mod $K_2$. The fourth module (4) works with each element of vectors $V_1$, $V_2$ and $V_3$, such that it divides the values of the elements between values $K_1$, $K_1$ and $K_2$ and obtains the remainder in each element. The result is three vectors the elements of which are the remainders obtained from the division applied by the fourth module (4). In one embodiment, the fourth module (4) is a computer program code segment suitable for carrying out a method that works as described and obtains vectors $V_1$, $V_2$ and $V_3$ from a module such as the third module (3) and the values $K_1$ can be pre-established.

A fifth module generating the rows of the matrix $M_e$, each row being: $M_e^1$ the first row, $M_e^2$ the second row, and $M_e^3$ the third row in the illustrated embodiment.

In one embodiment, the fifth module (5) is a computer program segment working with vectors $V_1$, $V_2$ and $V_3$ in the following manner: First, carrying out the vector product $V_1 \cdot V_2^T$. This product can be carried out in rows without needing to complete the matrix and to store it entirely. The $i^{th}$ row of the matrix will be formed by values $V_{1i} \cdot V_{2j}$ wherein $V_{1i}$ is the $i^{th}$ component, of vector $V_1$ and $V_{2j}$ is the $j^{th}$ component of vector $V_2$ wherein j will span all the columns of the matrix and of vector $V_2$. After the module obtains the first row, it rotates the row a number of times equal to the value of the first element of $V_3$ and provides the result. It works in this manner successively with each of the rows until completing the operation $(V_1, V_2^T)$ rot V3.

The pseudorandom sequence (s) generated is the concatenation of the rows in the order of generation. This sequence (s) is worked on by means of the XOR operator with the original message (M) and the result is transmitted through the communication channel.

Particular Embodiment

A particular embodiment starts from a signal, $x_k$, generated from a chaotic dynamical system. Specific values that are uncorrelated with respect to one another are taken from this signal:

m1=0.98754213
m2=0.98214356
m3=0.61102348
m4=0.62021309
m5=0.41102441
m6=0.35000227

The most significant digits and digits giving rise to rounding errors due to the architecture of the computer used for integration are eliminated from each sample such that the following are obtained:

s1=75421
s2=21435
s3=10234
s4=02130
s5=10244
s6=00022

The next step is to group these values to form two vectors $v_1$; $v_2$:

$$V_1 = \begin{pmatrix} 75421 \\ 21435 \\ 10234 \end{pmatrix}$$

$$V_2 = \begin{pmatrix} 02130 \\ 10244 \\ 00022 \end{pmatrix};$$

An expansion matrix is generated with these two vectors:

$$V_1, V_2^T = \begin{pmatrix} 76056 & 35306 & 37336 \\ 62408 & 79488 & 21035 \\ 82633 & 42655 & 44934 \end{pmatrix} = M_e$$

$K_1$ module=90107 is obtained from each element of the matrix.

Then, more samples m7, m8, m9 are taken from the starting signal and a vector $v_3$ to which the $K_2$ module=3 is applied is generated, obtaining the vector:

$$V_1 = \begin{pmatrix} 1 \\ 2 \\ 0 \end{pmatrix};$$

Therefore, the following is obtained by rotating the rows of the matrix $M_e$:

$$M_e = \begin{pmatrix} 37336 & 760563 & 35306 \\ 79488 & 21035 & 62408 \\ 82633 & 42655 & 44934 \end{pmatrix}.$$

Each element of the matrix is then transformed into binary by means of transforming decimal elements into binary numbers. For example, the pseudorandom sequence (of which only that corresponding to the first two numbers is shown) is obtained by concatenating the elements of the matrix into binary:

$$\frac{01001000111011000100}{34336}$$
$$\frac{10100100011000\ldots}{76056}$$

such that this sequence is the sequence which is mixed by means of the XOR operation with the message to reach the encrypted data stream.

This same set of operations carried out on the receiver side will allow decrypting the message.

The invention claimed is:

1. A method for coding or decoding a message, the method includes computer instructions implemented in a coding or a decoding module having a processor and a memory, the method comprising:

generating a pseudorandom sequence used to code or decode the message using, respectively, the coding module or the decoding module, wherein the pseudorandom sequence used to code the message is the same as the pseudorandom sequence used to decode the coded message, and wherein generating the pseudorandom sequence includes:
a) providing a differential equation of initial value x'=f (x,t);
b) providing an initial value for the differential equation $x_0=x(t_0)$;
c) providing an integration step $\delta_t$ for the differential equation for time discretization $t_k=t_0+k\cdot\delta_t$, k=1,2,3 . . . ;
d) carrying out the numerical integration of the differential equation from the initial value and with the step $\delta_t$ for obtaining the approximation to solution $x_k=x(t_k)$;
e) generating a first sequence of values by sampling the values $x_k$ numerically representable in floating point in the form of $0.d_0d_1d_2d_3d_4 \ldots d_r \ldots d_w\cdot 10^e$, e being the exponent, w the length of the mantissa, $d_0$ the most representative digit of the mantissa and $d_r$ a digit such that it and all the digits to its left of the approximation to solution $x_k$ coincide with the exact value of the solution of the differential equation;
f) generating the pseudorandom sequence with digits $d_i \ldots d_r$ from a selection of the sequence of values $x_k$ wherein i is a predetermined integer value verifying 0<i≤r;
g) wherein the pseudorandom sequence is expanded into a sequence with a greater number of elements according to the following steps:
pre-establishing a positive integer value DIM;
constructing two vectors $V_1$ and $V_2$ of dimension DIM of integers from the pseudorandom sequence;
constructing an expansion matrix $M_e$ of dimension DIM×DIM from the product $V_1\cdot V_2^T$ wherein $V_2^T$ is the transposed vector of $V_2$; and
generating the expanded sequence by means of concatenating the rows of the matrix $M_e$.

2. The method according to claim 1, wherein the numerical integration of a system of n differential equations, $x'_s=f_s(x_1, x_2, \ldots x_n, p_1, p_2, \ldots p_m, t)$, s=1 . . . n, is carried out in step d), n also being the number of unknowns, and containing m parameters, $p_j$, j=1 . . . m, such that the pseudorandom sequence in step f) is generated from one of the n variables preselected from the system of differential equations.

3. The method according to claim 1, wherein after step f), each digit d is depicted in binary, with a pre-established word size D1, the concatenation of the digits forming a binary sequence.

4. The method according to claim 1, wherein after step f), each digit d is made to correspond to a binary expression, the concatenation of the digits forming a binary sequence.

5. The method according to claim 3, wherein a word size $D_2$ is pre-established and integer digits are formed from the binary sequence using words of $D_2$ bits.

6. The method according to claim 1, wherein:
a value $K_1$ is pre-established; and
before generating the expanded sequence each element of the matrix $M_e$ is substituted with the value resulting from calculating the $K_1$-module thereof.

7. The method according to claim 1, wherein:
in addition to the vectors $V_1$ and $V_2$, a vector $V_3$ of dimension DIM of integers is constructed from the pseudorandom sequence generated; and
on each of the rows of the matrix $M_e$, before generating the expanded sequence by means of concatenating the rows of the matrix $M_e$, rearranging the sequence of the integers in each of the rows of $M_e$ by circularly rotating the position of the integers in a pre-established direction, according to the integer value established by the same row of the vector $V_3$.

8. The method according to claim 1, wherein:
a value $K_2$, preferably the DIM value, is pre-established; and
each element of the vector $V_3$ is substituted with the value resulting from calculating the modulus-$K_2$ thereof.

9. The method according to claim 1, wherein for generating the expanded sequence by means of concatenating the rows of the matrix $M_e$ only the values of each row are calculated to avoid storing the complete matrix $M_e$.

10. A method for coding a data stream for the transmission of said data by means of a coded stream wherein the coding is the result of comparing the data stream with a second data stream formed by a pseudorandom sequence by means of an exclusive comparison operation (XOR), or a method for decoding a coded data stream wherein the decoding is the result of comparing the coded data stream with a second data stream formed by a pseudorandom sequence by means of an exclusive comparison operation (XOR), characterized in that the generation of the pseudorandom sequence is made by means of a method according to claim 1.

11. The method according to claim 10, wherein the following steps are carried out:
determining an integration time T;
proposing a perturbed system of equations which can be expressed in the following manner:

$$x'^A_1=f_1(x_1,x_2, \ldots x_n,p_1,p_2, \ldots p_m,t)+\epsilon_1^A(x_1^B-x_1^A),$$

$$x'^A_2=f_2((x_1,x_2, \ldots ,x_n,p_1,p_2, \ldots ,p_m,t)+\epsilon_2^A(x_2^B-x_2^A),$$

$$x'^A_n=f_n(x_1,x_2, \ldots ,x_n,p_1,p_2, \ldots ,p_m,t)+\epsilon_n^A(x_n^B-x_n^A),$$

for the generation of the coding sequence as well as initial values;
proposing a perturbed system of equations which can be expressed in the following manner:

$$x'^B_1=f_1(x_1,x_2, \ldots p_1,p_2, \ldots ,p_m,t)+\epsilon_1^B(x_1^A-x_1^B),$$

$$x'^B_2=f_2(x_1,x_2, \ldots ,x_n,p_1,p_2, \ldots ,p_m,t)+\epsilon_2^B(x_2^A-x_2^B),$$

$$x'^B_n=f_n(x_1,x_2, \ldots x_n,p_1,p_2, \ldots p_m,t)+\epsilon_n^B(x_n^A-x_n^B).$$

for the generation of the decoding sequence as well as initial values not necessarily coinciding with the initial values proposed for the generation of the coding sequence;
prior to coding and decoding the data, generating a first coding sequence and a first decoding sequence by integrating both perturbed systems of equations over time T wherein both systems are coupled by means of the terms multiplied by $\epsilon_s^A, \epsilon_s^B$, s=1 . . . n, $\epsilon_s^A, \epsilon_s^B$ being positive values in which at least one value in the system associated with the coding and the other value in the system associated with the decoding is non-null such that an exchange of at least the values of the variables $x_1, x_2, \ldots, x_n$ which are multiplied by a non-null value $\epsilon_s^A, \epsilon_s^B$, s=1 . . . n is carried out during the integration through an exchange channel until the convergence of both systems;
providing the data coding and decoding sequence by integrating the same equations from the values achieved in the integration carried out in the preceding step independently used as an initial condition without exchanging coupling values and without incorporating the terms with $\epsilon_s^A$, $\epsilon_s^B$, s=1 ... n.

12. The method according to claim 11, wherein the exchange channel is encrypted by means of public key.

13. A system for coding messages for transmission on a transmission channel between a first device at a first end of a communication and a second device at a second end of the communication, the system comprising:
- a message coder at the first device configured to code a message for transmission to, and decoding at, the second device, wherein coding the message using the message coder includes:
- comparing a pseudorandom coding sequence to the message using an exclusive comparison operation (XOR), wherein the pseudorandom coding sequence is independently generated at the first device and at the second device enabling coding and decoding of the message without transmission of a key;
- wherein the message coder at the first device is configured to generate the pseudorandom coding sequence by:
  - providing a differential equation of initial value x'=f(x, t);
  - providing an initial value for the differential equation $x_0=x(t_0)$;
  - providing an integration step $\delta_t$ for the differential equation for time discretization $t_k=t_0+k\cdot\delta_t$, k=1,2,3 ... ;
  - carrying out the numerical integration of the differential equation from the initial value and with the step $\delta_t$ for obtaining the approximation to solution $x_k=x(t_k)$;
  - generating a first sequence of values by sampling the values $x_k$ numerically representable in floating point in the form of $0.d_0 d_1 d_2 d_3 d_4 \ldots d_r \ldots d_w \cdot 10^e$, e being the exponent, w the length of the mantissa, $d_0$ the most representative digit of the mantissa and $d_r$ a digit such that it and all the digits to its left of the approximation to solution $x_k$ coincide with the exact value of the solution of the differential equation;
  - generating the pseudorandom coding sequence with digits $d_i \ldots d_r$ from a selection of the sequence of values $x_k$ wherein i is a predetermined integer value verifying 0<i≤r, and wherein the pseudorandom coding sequence is expanded into a sequence with a greater number of elements by:
  - pre-establishing a positive integer value DIM;
  - constructing two vectors $V_1$ and $V_2$ of dimension DIM of integers from the pseudorandom sequence;
  - constructing an expansion matrix $M_e$ of dimension DIM×DIM from the product $V_1 \cdot V_2^T$ wherein $V_2^T$ is the transposed vector of $V_2$; and
  - generating the expanded sequence by means of concatenating the rows of the matrix $M_e$.

14. A system for decoding coded messages received on a transmission channel established between first device at a first end of a communication and a second device at a second end of the communication, the system comprising:
- a message decoder at the second device configured to decode a coded message received from the second device, wherein decoding the coded message using the message decoder includes:
- comparing a pseudorandom coding sequence to the coded message using an exclusive comparison operation (XOR), wherein the pseudorandom coding sequence is independently generated at the first device and at the second device enabling coding and decoding of the message without transmission of a key;
- wherein the message decoder at the second device is configured to generate the pseudorandom coding sequence by:
  - providing a differential equation of initial value x'=f(x, t);
  - providing an initial value for the differential equation $x_0=x(t_0)$;
  - providing an integration step $\delta_t$ for the differential equation for time discretization $t_k=t_0+k\cdot\delta_t$, k=1,2,3 ... ;
  - carrying out the numerical integration of the differential equation from the initial value and with the step $\delta_t$ for obtaining the approximation to solution $x_k=x(t_k)$;
  - generating a first sequence of values by sampling the values $x_k$ numerically representable in floating point in the form of $0.d_0 d_1 d_2 d_3 d_4 \ldots d_r \ldots d_w \cdot 10^e$, e being the exponent, w the length of the mantissa, $d_0$ the most representative digit of the mantissa and $d_r$ a digit such that it and all the digits to its left of the approximation to solution $x_k$ coincide with the exact value of the solution of the differential equation; and
  - generating the pseudorandom coding sequence with digits $d_i \ldots d_r$ from a selection of the sequence of values $x_k$ wherein i is a predetermined integer value verifying 0<i≤r, and wherein the pseudorandom coding sequence is expanded into a sequence with a greater number of elements by:
  - pre-establishing a positive integer value DIM;
  - constructing two vectors $V_1$ and $V_2$ of dimension DIM of integers from the pseudorandom sequence;
  - constructing an expansion matrix $M_e$ of dimension DIM×DIM from the product $V_1 \cdot V_2^T$ wherein $V_2^T$ is the transposed vector of $V_2$; and
  - generating the expanded sequence by means of concatenating the rows of the matrix $M_e$.

15. A communication system for providing secure communication of messages between a first terminal and a second terminal, the system comprising:
- a message coder at the first terminal configured to generate an encrypted message for transmission to the second terminal by comparing a message with an encryption sequence using an exclusive comparison operation (XOR);
- a message decoder at the second terminal configured to decrypt the encrypted message received by the first terminal by comparing the encrypted message with a decryption sequence using an exclusive comparison operation (XOR); and
- wherein the message coder and message decoder are configured to independently generate the encryption and decryption sequences at the first terminal and at the second terminal enabling encrypting and decrypting of the message without transmission of a key, and wherein the encryption and decryption sequences are identical pseudorandom sequences generated at the message coder and at the message decoder by:
  - providing a differential equation of initial value x'=f(x, t);
  - providing an initial value for the differential equation $x_0=x(t_0)$;
  - providing an integration step $\delta_t$ for the differential equation for time discretization $t_k=t_0+k\cdot\delta_t$, k=1,2,3 ... ;
  - carrying out the numerical integration of the differential equation from the initial value and with the step $\delta_t$ for obtaining the approximation to solution $x_k=x(t_k)$;

generating a first sequence of values by sampling the values $x_k$ numerically representable in floating point in the form of $0.d_0 d_1 d_2 d_3 d_4 \ldots d_r \ldots d_w \cdot 10^e$, e being the exponent, w the length of the mantissa, $d_0$ the most representative digit of the mantissa and $d_r$ a digit such that it and all the digits to its left of the approximation to solution $x_k$ coincide with the exact value of the solution of the differential equation; and generating the pseudorandom sequence with digits $d_i \ldots d_r$ from a selection of the sequence of values $x_k$ wherein i is a predetermined integer value verifying $0 < i \leq r$, and wherein the pseudorandom sequence is expanded into a sequence with a greater number of elements by:

pre-establishing a positive integer value DIM;

constructing two vectors $V_1$ and $V_2$ of dimension DIM of integers from the pseudorandom sequence;

constructing an expansion matrix $M_e$ of dimension DIM×DIM from the product $V_1 \cdot V_2^T$ wherein $V_2^T$ is the transposed vector of $V_2$; and generating the expanded sequence by means of concatenating the rows of the matrix $M_e$.

16. The communication system according to claim 15, wherein the pseudorandom sequences generated at the first terminal and the second terminal are the same.

* * * * *